United States Patent [19]
Reskusic et al.

[11] 3,878,807
[45] Apr. 22, 1975

[54] WATER INTAKE STRAINER FOR USE ON BOATS

[76] Inventors: Nikola Reskusic, 1346 W. 19th St., San Pedro, Calif. 90732; Jakov Reskusic, 1070 W. 18th St., San Pedro, Calif. 90731

[22] Filed: Dec. 26, 1973

[21] Appl. No.: 428,021

[52] U.S. Cl................................. 114/198; 115/.5 R
[51] Int. Cl................................................ B63b 13/00
[58] Field of Search........ 114/198, 185, .5 R, 183 R; 115/.5 R; 43/55

[56] References Cited
UNITED STATES PATENTS
2,281,459   4/1942   Scott-Paine.......................... 114/185
FOREIGN PATENTS OR APPLICATIONS
163,131   4/1958   Sweden............................... 115/.5 R
330,798   8/1903   France................................ 115/.5 R
652,324   2/1963   Italy................................... 115/.5 R Primary Examiner—Trygve M. Blix
Assistant Examiner—Charles E. Frankfort
Attorney, Agent, or Firm—Huebner & Worrel

[57] ABSTRACT

A water intake strainer for use on boats having a construction such as to increase the flow of water through the strainer as well as to prevent a vacuum or air bubbles to be created and interrupt the flow of water through the strainer into a standpipe. The construction including an upward tapering of the strainer in the normal direction of travel so as to expose a greater surface for water to enter the strainer.

5 Claims, 4 Drawing Figures

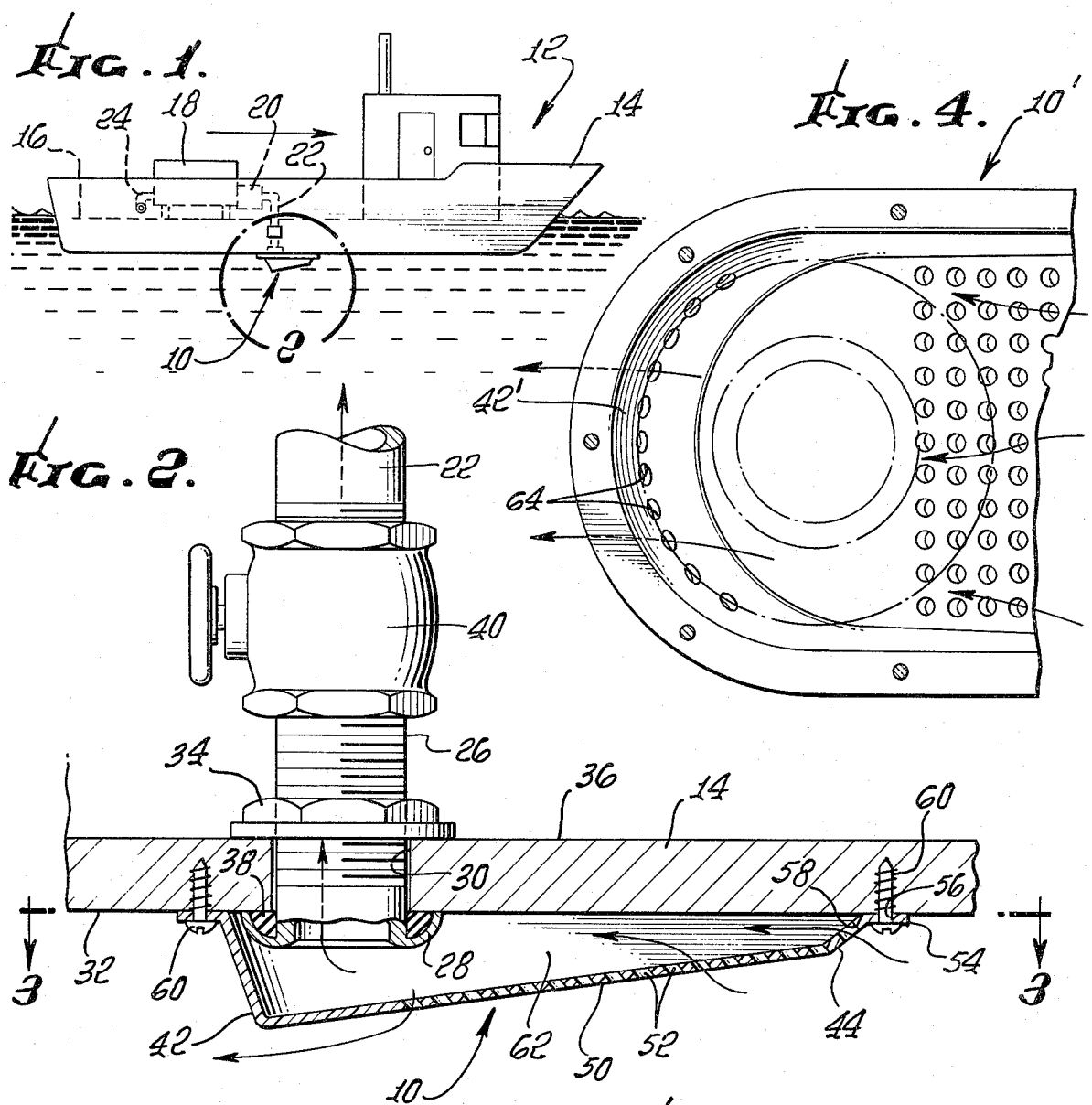
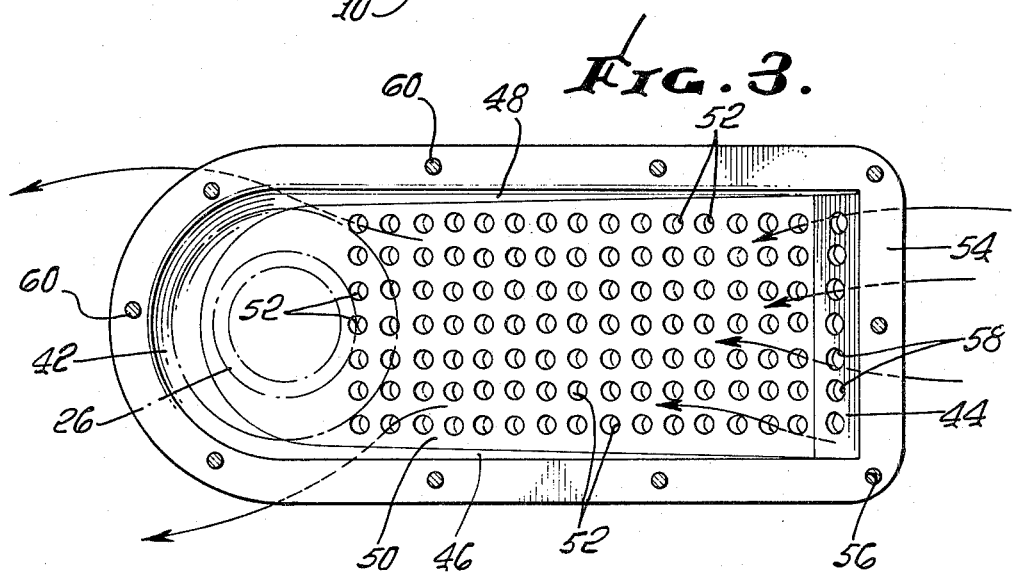

WATER INTAKE STRAINER FOR USE ON BOATS

BACKGROUND OF THE INVENTION

In boats equipped with engines which are water cooled it is necessary to include a pipe extending from the engine through the boat to the water and to also include pumping equipment to bring the water into the engine. Additionally, boats equipped with toilets also require pipes and pumping equipment for proper use. Further, bait tanks also require the circulation of water therethrough and the pumping of the same through a standpipe in the hull of the boat.

It is necessary that strainers be employed on the exterior of the hull over the end of the standpipe to prevent the pumping of foreign matter into the pipe.

Heretofore conventional strainers which have been employed are generally round with an outwardly curved circular crown wherein a plurality of holes are drilled to allow the water to enter the pipe. Additionally, some prior art strainers of the exterior construction set out above instead of holes utilize elongated parallel openings.

These constructions have the disadvantage of allowing water to enter and churn within the strainer causing air bubbles to interrupt the flow of water into the standpipe. Additionally, with the use of the elongated openings and general crown construction foreign matter can become engaged therein closing off the strainer and creating a vacuum in the pipe and system. Such interruptions in the flow of water can cause malfunctions of equipment utilizing the flow of water.

SUMMARY OF THE INVENTION

It is an object of this invention to provide a strainer being generally elongated and including a generally flat tapered strainer portion which exposes a greater area in the normal direction of travel where water passing through openings in the strainer portion can enter in a greater volume than heretofore possible.

Additionally, it is an object to provide openings at such an angle to the line of normal travel to accept a greater volume of water than the prior art.

A further object is to provide a strainer with a plurality of jet openings horizontally above the normal openings to allow water to enter the strainer in accelerated velocity to assure a reduction or elimination of air bubbles by decreasing the normal water flow turbulence within the strainer, and to aid in compressing the water entering the strainer.

Still another object of the invention is to provide a strainer with a length substantially greater than the diameter of the standpipe and the strainer is mounted with the pipe opening at the normal back portion of the strainer.

These and other objects will become apparent from the following description and drawings.

BRIEF DESCRIPTION OF THE DRAWINGS

FIG. 1 is an environmental view of a boat equipped with the new strainer;

FIG. 2 is a side elevational sectional view of the strainer in place on the boat hull and standpipe construction, with which it is utilized;

FIG. 3 is a top elevational view of the strainer taken on line 3—3 of FIG. 2; and FIG. 4 is a top elevational view of a modified form of the strainer.

DETAILED DESCRIPTION OF THE PREFERRED EMBODIMENT

For purposes of illustration in FIG. 1 the strainer member generally designated 10 is mounted on a boat designated 12 having a hull portion 14. The strainer 10 for proper use, which is to be described, is mounted below the water line 16. In FIG. 1, for purposes of illustration, a conventional bait tank 18 is mounted on the boat 12. Associated with the tank 18 is a water pump 20 and a standpipe 22 extending from the pump 20 through the hull 14 below the water line 16. The bait tank 18 includes a water discharge pipe 24 exiting through the hull 14 above the water line 16.

In operation the pump 20 pulls water in through the standpipe 22 into the bait tank 18 where it is circulated and then discharged out the pipe 24. The same general principle prevails when a marine engine is water cooled or when there is a toilet within a boat. In other words, a pump is utilized to pull water into the boat and to the respective apparatus and it is then discharged. Additionally, depending on the size of the boat there can be several standpipes 22 used.

Specifically, a standard standpipe 22, includes an externally threaded shank section or true-hull connection 26 with an annular flange 28. The hull 14 is drilled forming an opening 30 slightly larger than the diameter of the standpipe 22 or shank section 26, but not larger than the exterior diameter of the flange 28. The pipe section 26 is then inserted from the exterior 32 of the hull 14 through the opening 30. A locking nut 34 is then threaded onto the pipe section 26 bearing against the interior 36 of the hull 14 locking the pipe section 26 in place. There can be a sealing member 38 positioned between the flange 28 and the exterior 32 of the hull 14 to prevent water from leaking into the boat around the exterior of the shank section 26.

As a marine safety precaution a conventional gate valve 40 is mounted between the standpipe 22 and pipe section 26 which can be closed in event of repairs to the line, but is normally maintained in an open condition to allow water to be pumped therethrough.

The diameter of a standpipe 22 will vary normally from ⅜ of an inch to 6 inches depending on the requirement for water to be pumped. The strainer 10 may be of varying sizes to accommodate the various pipe diameters. It is contemplated a set of various sizes of strainers 10 can be provided.

The strainer 10 is preferably made of molded glass cloth and resin to assure both desirable strength and to prevent electrolosis when used in salt water. However, the material per se can be other forms of resistent plastic or metal without departing from the spirit of the invention.

Strainer 10 is generally oblong as best seen in FIG. 3 and has a trailing or rounded rear portion 42 and a leading or generally flat front portion 44. The strainer has parallel spaced apart side walls 46 and 48 which extend between the trailing and leading portions 42 and 44.

In cross section, best seen in FIG. 2, the depth of the leading portion 44 is less than the trailing portion 42. Interconnecting the leading and trailing portions 42 and 44, and the side walls 46 and 48 is a strainer portion or bottom wall 50. As can be seen the wall 50 is angled downwardly from the leading portion 44 to the trailing portion 42. In cross section, see FIG. 2 the strainer 10 is generally wedge shaped.

A plurality of holes 52 are drilled through the strainer portion 50 to allow water to enter. The diameter and number of holes will vary depending upon the overall size of the strainer 10. Additionally, the holes 52 are preferably drilled at an angle toward the horizontal relative to the planar surface of the strainer portion 50. In addition to holes 52 there are water jet means or a plurality of jet holes 58 which extend through the generally flat front portion 44.

The strainer 10 also includes an annular mounting flange 54 extending around the periphery of the strainer with screw holes 56 formed therein.

In order to properly mount the strainer 10, it is positioned on the exterior 32 of the hull 14, after the shank section 26 has been locked in place. The strainer 10 is mounted so that the trailing portion 42 covers and surrounds the flange 28 of the shank portion 26 of the standpipe 22, and is adjacent thereto. The remaining portion of the strainer 10 extends forwardly of the shank portion 26 along the hull 14 in the normal forward direction of the boat 14. Appropriate screws 60 are inserted through the screw holes 56 and secure the strainer 10 to the hull as best seen in FIG. 2.

With the construction of the strainer 10 whereby the strainer portion 50 is angled relative to the normal line of travel, the portion 50 will present a larger area or face for direct acceptance of water and when coupled with the slant of the holes 52 there will be assured a greater volume of water being taken into the strainer 10 for pumping up the pipe 22.

It has been found that when a boat is traveling at relatively high speeds through the water and water is being pumped into the pipe 22, a great deal of turbulence can be created within the strainer, which in turn can cause air bubbles. Such air bubbles are of course not desirable to flow into the standpipe 22 and have been known to cause malfunctions of pumps and machinery associated therewith. In order to prevent air bubbles the jet holes 58 are provided. As the boat moves through the water the leading portion 44 being flat and extending normal to the line of travel will receive water with a great impact. The jet holes 58 being through the leading portion 44 will allow water to pass therethrough at a greater velocity than the water through holes 52 and will thus prevent any backing up of the water within a cavity 62 formed by the side wall 46 and 48, trailing and leading portions 42 and 46, and the bottom wall portion 50. Such jet water action will also compress the water entering the holes 52 and prevent air from blowing in the pipe.

Further, with the angling of the strainer or wall portion 50 downward from the normal line of travel the possibility of foreign matter in the water engaging and sticking to the strainer 10 is minimized and thus the strainer 10 cannot be sealed shut and a vacuum created by the pumping action, where serious damage to the pump and associated equipment is possible.

There is illustrated in FIG. 4 a modification of the strainer in the form of a strainer 10', wherein the rounded rear portion 42' includes a plurality of trailing jet holes 64, which are preferably axially aligned with jet holes 58. In certain larger size strainers 10 it has been found that there could be an excessive amount of water build-up at the entrance to the standpipe 22 within the cavity 62 and unwanted turbulence can occur. To that end trailing jet holes 64 may be provided to release some of the water and prevent the unwanted turbulence.

Although we have herein shown and described our invention in what we conceived to be the most practical and preferred embodiment, it is recognized that departures may be made therefrom within the scope of our invention.

We claim:

1. In a water intake strainer to be mounted on the hull of a boat below the water line wherein said strainer overlies and is independent of the intake end of a water stand-pipe passing through said boat hull into the interior thereof, the improvement of a strainer member which is generally oblong and includes a leading portion and a trailing portion, a pair of elongated parallel side walls spaced one from the other extending between said leading and trailing portion, and a bottom strainer wall encompassing the area defined by said leading and trailing portions and said side walls and said bottom strainer wall inclined downwardly and rearwardly from said leading to said trailing portion;

said bottom strainer wall including a plurality of openings extending through said wall substantially throughout the entire area of said wall, whereby water may pass therethrough to said standpipe;

water jet means formed in said strainer member intermediate the said openings and said hull whereby when the boat is underway water may pass through said jet means at an increased velocity over water passing through said strainer bottom wall intermixing the water and thus reduce water turbulence within said strainer member; and said strainer member embodying attachment means for securing said member to said boat hull.

2. A water intake strainer as defined in claim 1 wherein said leading portion includes a generally flat forward wall extending normal to said side walls and slanting toward said trailing portion, and said trailing portion includes a semi-circular wall slanting toward said leading portion and having a height greater than said generally flat wall.

3. A water intake strainer as defined in claim 1 wherein said openings in said bottom strainer wall are holes having axes offset from the perpendicular relative to the inclined plane of said bottom strainer wall.

4. A water intake strainer as defined in claim 2 wherein said water jet means include a plurality of holes extending through said generally flat wall with axes normal to the plane of said generally flat wall.

5. A water intake strainer as defined in claim 4 wherein said water jet means includes a plurality of holes extending through said semi-circular wall generally in line with said holes in said generally flat wall of said leading portion.

* * * * *